Aug. 17, 1943.    L. R. BUCKENDALE    2,326,752
MULTISPEED DRIVE AXLE
Filed Oct. 3, 1941
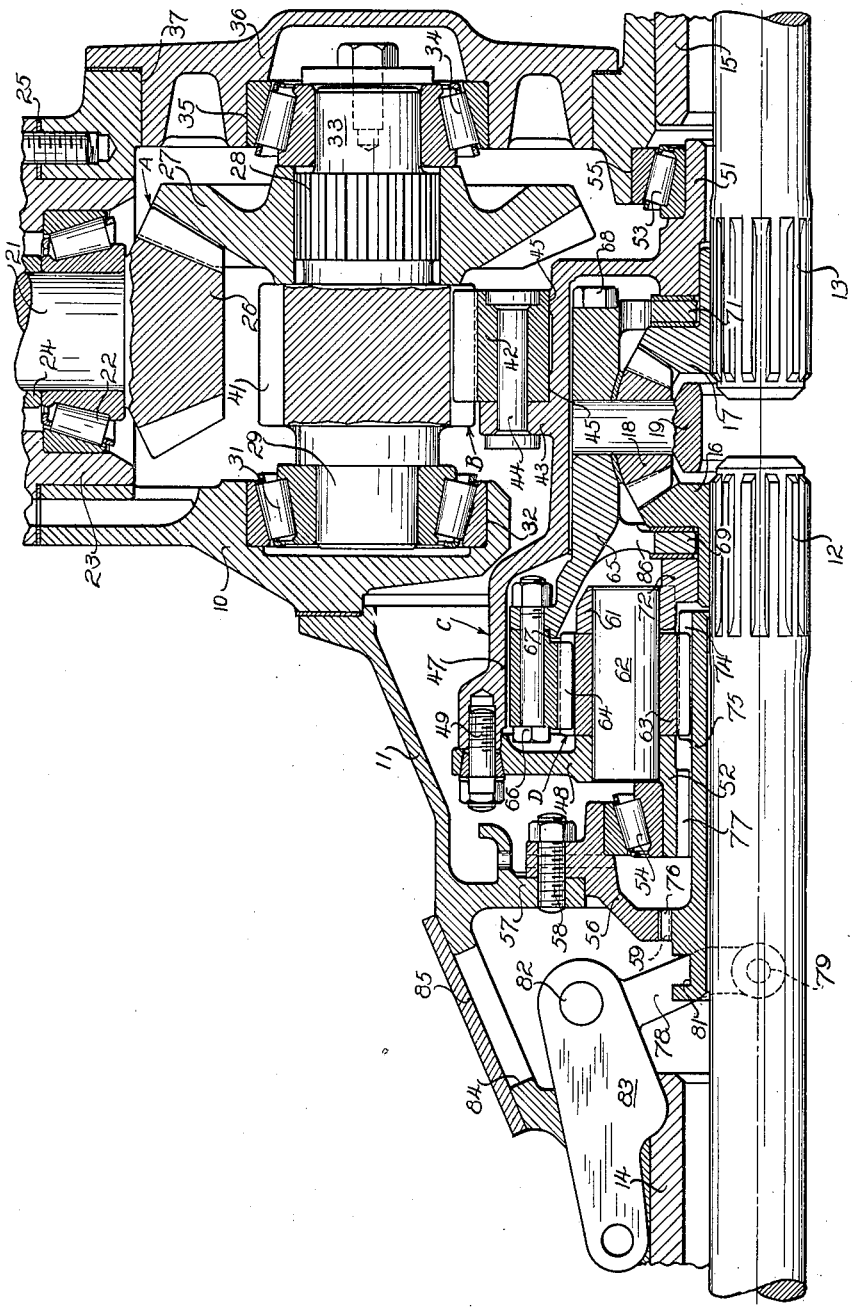
Inventor
Lawrence R. Buckendale
By Strauch & Hoffman
Attorneys Patented Aug. 17, 1943

2,326,752

UNITED STATES PATENT OFFICE 2,326,752

MULTISPEED DRIVE AXLE

Lawrence R. Buckendale, Detroit, Mich., assignor to The Timken-Detroit Axle Company, Detroit, Mich., a corporation of Ohio Application October 3, 1941, Serial No. 413,538
6 Claims. (Cl. 74—314)

The present invention relates to power transmitting mechanisms and is more particularly concerned with multi-speed planetary drive axles for automotive vehicles, but it is not limited to such use.

Although so-called planetary two-speed drive axles have been in use for many years in trucks and buses and other heavy duty vehicles, and in recent years have been used to a limited extent in pleasure cars to afford an overdrive at the higher or cruising speeds, they leave much to be desired because they are of complicated costly construction and do not afford a sufficiently low speed reduction to meet all driving and loading conditions.

It is the major object of this invention to provide a novel drive axle embodying non-planetary gear mechanisms and a multi-speed planetary mechanism arranged in series and operable to transmit power from the drive shaft to the axle shafts at several different speed ratios.

Another important object is to provide drive axles having parallel counter and axle shafts, with a novel gear reduction assembly, comprising a spur gear assembly on the countershaft delivering power to the axle shafts through a multi-speed planetary gear mechanism located concentric therewith.

A further object is to provide a drive axle having a novel countershaft and housing assembly providing maximum strength and yet enabling assembly and disassembly of the unit to be carried out and the countershaft removed with a minimum of time and effort, and at the same time being of efficient, compact, and durable design.

Another object is to provide a drive axle having a countershaft assembly which may be readily removed and replaced by one affording two additional selectively shiftable spaced ratios.

Another object is to provide a planetary drive mechanism of novel form and to so associate it with the other parts of the axle that a unit of extremely compact and yet rugged construction is achieved.

The invention also aims to provide a novel housing assembly, and other subordinate improvements which will become apparent as the specification proceeds in conjunction with the annexed drawing and from the appended claims.

In the drawing, the single figure is a longitudinal sectional view, taken on a substantially horizontal plane, of a drive axle embodying the invention, the mechanism below the axle shafts being broken away to simplify the disclosure.

With continued reference to the drawing, the mechanism comprises a set of bevel gears A transmitting power to spur gears B which in turn drive a rotor C. Power is transmitted from the rotor through a planetary mechanism D to the axle shafts, the power being divided between them by a differential mechanism in well known manner.

The mechanism is contained in a housing split transversely to the axle shaft into a major section 10 and a minor section 11, the two sections being detachably secured together by cap screws (not shown) in well known manner. A pair of axle shafts 12 and 13 are rotatably mounted in tubular extensions 14 and 15 rigidly secured in housing sections 11 and 10, respectively. A pair of differential side gears 16 and 17 are splined to the inner ends of the axle shafts and mesh with a plurality of miter gears 18 carried by a differential spider 19. Preferably three or more miter gears are used, for a purpose that will presently appear.

PRIMARY DRIVE

Power is transmitted to a pinion shaft 21 journalled in a front bearing (not shown) and a rear bearing 22 carried in a sleeve-like support 23 detachably bolted to the front end of housing section 10. A spacer 24 maintains the inner races of the bearings in proper spaced relationship and the desired number of shims 25 may be interposed between member 23 and the housing to provide the proper bearing clearance.

The pinion shaft is preferably integrally formed with a bevel pinion 26, which meshes with a bevel gear 27 splined to a countershaft 28. The left-hand end of the countershaft is provided with a reduced portion 29 journalled in anti-friction bearing 31. Bearing 31 fits in a cylindrical pocket 32 provided on casing section 10, and as seen, the pocket extends partially across the mouth of casing 10.

The right-hand end of the countershaft is provided with a reduced portion 33 journalled in an anti-friction bearing 34. By supporting bearing 34 in a seat 35 in a closure assembly 36, which fits over an opening 37 in housing section 10 of slightly greater external diameter than gear 27, it is possible to remove the closure assembly and to then lift out the entire countershaft assembly. Power is preferably transmitted from the countershaft to the rotor by a spur gear assembly, compactly related to the other parts of the mechanism, and which will now be described.

Preferably formed as an integral part of countershaft 28 is a spur gear 41 which meshes with a spur gear 42 mounted on rotor C. Gear 42 is of ring-like form and is rigidly secured to a flange 43 on the rotor by means of rivets 44 or the like. The inner surface of gear 42 snugly fits over a pair of circumferential piloting surfaces 45 on the rotor, which insure accurately concentric relation of the gear about the axis of the rotor, and materially reinforce the gear against distortion in response to the stresses set up therein during operation.

Spur pinion 41 accordingly drives spur gear 42 at a speed reduction, the ratio obtained depending upon the relative sizes of the gear and pinion, it being understood the gear sizes will be so chosen to afford the proper ratio to suit the requirements of the installation involved.

The planetary overdrive mechanism which transmits the power from the rotor to the axle shafts, and which is so designed as to compactly cooperate with the countershaft assembly, will now be described.

The planetary rotor is made up of transversely split sections 47 and 48, detachably secured together by bolt and nut assemblies 49. Rotor sections 47 and 48 are provided with hub portions 51 and 52, respectively, journalled in bearings 53 and 54. Bearing 53 is carried directly in a seat 55 in main housing 10, while bearing 54 is carried in a ring-like support 56 detachably secured to an internal web 57 in housing section 11 by stud and nut assemblies 58. Support 56 is also provided with a set of internal teeth 59, for a purpose that will presently appear.

The rotor is provided with a large diameter portion at its left-hand end and a smaller diameter central portion, spur gear 42 giving the right-hand end of the rotor a comparatively large external diameter. The construction is nevertheless compact by reason of gear 42 and the rotor extending inwardly beyond the periphery of bevel gear 27, in overlapped relation, and the fact that support 32 for countershaft bearing 31 is located opposite and projects slightly into the space between the two large diameter sections of the rotor. Disassembly of the structure is also readily accomplished because after main housing section 11 has been removed, the rotor assembly may be bodily shifted to the left a sufficient distance to remove bearing 53 from its outer race before rotor flange 43 will contact bearing support 32. As soon as the rotor has been removed, closure assembly 36 may be removed and the entire countershaft assembly, including gear 27, slid to the right and out of the housing section 10 through opening 37.

Tightly secured in rotor section 48 and in a ring member 61 are a plurality of planet shafts (preferably 3) 62. Section 48 and ring 61 at circumferentially spaced points, intermediate shafts 62, are provided with matching bosses which are rigidly secured together in well known manner (not shown). Journalled on each shaft 62 is a planet gear 63 which constantly meshes with a ring or orbit gear 64. The ring gear is detachably secured to a casing 65 by means of bolt and nut assemblies 66, a pilot surface 67 being provided to insure accurate centering of the gear. Casing 65 is split transversely of the axle shafts and secured together by cap screws 68, the ends of spider 19 being clamped between the casing sections in well known manner. The casing is journalled solely by the floating of gear 64 upon the pitch lines of planet gears 63 at one end, and by the floating of miter gears 18 upon the side gears at the other end. Webs 69 and 71, provided on casing 65 and having thrust washers at opposite sides, limit axial movement of the assembly by engaging at one end a ring 72, secured to the rotor, and the hub of rotor C at the other, it being understood that sufficient clearance is provided to avoid contact with the side gear hubs.

Planets 63 also constantly mesh with sun gear teeth 74 provided on a sleeve or quill member 75 which is mounted for both rotation and axial movement in the housing. Quill 75 is also provided with external teeth 76 adapted to be meshed with teeth 59 on support 56. Sun gear teeth 74 are also adapted to be meshed with teeth 77 provided inside hub 52 of rotor section 48.

The quill is adapted to be shifted longitudinally into its various operative positions by means of a yoke 78 having a pair of pins 79 riding in a groove 81 in the quill. Yoke 78 is rigidly secured to a shaft 82 having an actuating lever 83 rigidly secured thereto externally of the housing. Access to the shifter mechanism is obtained through an opening 84 in housing section 11, which is adapted to be covered by a closure 85 detachably secured in place in well known manner.

*Operation*

With the parts disposed in the positions shown, with teeth 76 engaged with teeth 59, sleeve 75 is locked against rotation. Rotation of rotor C, by means of the bevel and spur gear reductions, causes shafts 62 to travel in an orbit about the axis of the rotor, and as they planetate about stationary sun gear teeth 74, they drive ring gear 64 in the same direction, but at a greater rate of speed than casing C. The ring gear in turn transmits the power to casing 65, which in turn divides the power and transmits it through the differential to axle shafts 12 and 13. The parts are accordingly in the geared drive or the overdrive ratio.

Assuming now that the quill is shifted to the left, a sufficient distance to disengage teeth 76 from teeth 59, but insufficient to bring sun gear teeth 74 into engagement with teeth 77, no power is transmitted because travel of shafts 62 in an orbit around the axis of the rotor merely results in the planets idly rotating the quill. The parts are accordingly in neutral under these conditions.

When lever 83 is rocked further clockwise, to bring the quill into its extreme left-hand position and engage sun gear teeth 74 with teeth 77, and to also allow them to remain in partial engagement with the planets, the planets are locked against rotation about their axes. The resulting travel of shafts 62 causes the locked planet gears to drive ring gear 64 synchronously with the rotor, which results in casing 65 and shafts 12 and 13 being rotated synchronously with the rotor. The parts are accordingly disposed in direct or a one-to-one driving ratio.

It is to be understood that the foregoing shift operations may be carried out by momentarily interrupting the drive between shaft 21 and the prime mover, as for instance by releasing the clutch of an automotive vehicle. Moreover, in the interest of simlifying the disclosure, no shift assisting mechanism has been shown, but it is to be understood that any well known form of device for facilitating shifting the quill into engagement with its cooperating parts may be provided without departing from the spirit of the invention.

Lubrication of the unit may be effected in a manner similar to that disclosed in my co-pending application for Multispeed drive axle, Serial No. 413,537, filed of even date herewith, openings 86 being provided to permit lubricant travel into the planetary gear section of casing 65.

As previously pointed out, upon removal of rotor C from the mechanism, closure assembly 36 may be removed and the countershaft assembly slid to the right out of the housing. The novel countershaft and closure assembly of the mechanism makes it possible to substitute a slightly modified type of countershaft assembly embodying a bevel gear, which is journalled upon the countershaft rather than being fixed to it, and a modified closure assembly embodying an auxiliary casing having planetary mechanism therein drivingly connected to both the countershaft and the bevel gear, to secure two selectively shiftable additional speed reductions, in accordance with the disclosure of my co-pending application, Serial No. 413,540, for Multispeed drive axle, filed of even date herewith.

From the foregoing detailed disclosure it is apparent that the invention provides a drive axle having three speed reductions, namely, a bevel reduction, a spur reduction and a planetary reduction, and that the latter is selectively shiftable into two different speed ratios, and that the countershaft and planetary rotor assemblies are associated in novel manner to provide maximum strength; compactness; simplicity and accessibility for repair and replacement of parts, with minimum weight, and that a novel housing assembly is provided which facilitates disassembly and also permits interchange of the countershaft assembly with one providing an axle having two selectively shiftable additional speed reductions.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

Although I have shown the invention incorporated in an axle having a transversely split housing, it is to be understood that if desired a carrier type construction may be used, embodying a one-piece axle housing, in combination with a bolted on auxiliary housing or carrier supporting all of the gear mechanisms, without departing from the spirit of the invention.

What is claimed and desired to be secured by United States Letters Patent is:

1. In a drive axle, a housing having a pair of axle shafts journalled therein; a drive shaft mounted for rotation in said housing and disposed substantially normal to said axle shafts; a countershaft mounted for rotation between said drive and axle shafts and disposed parallel to the latter; a bevel gear on said countershaft meshing with a bevel pinion on the drive shaft; a rotor mounted for coaxial rotation about the axes of said axle shafts and having a small diameter portion carrying a spur gear meshing with a spur pinion on said countershaft, said spur gear, spur pinion and bevel gear being of such diameters, and said countershaft being so disposed with respect to the said rotor as to locate said spur gear and the end of the small diameter portion of said rotor in close axial proximity and in radial overlapping relationship with said bevel gear, said rotor having a large diameter portion projecting axially to one side of and remote from said spur gear and containing a two speed planetary gear mechanism; a differential mechanism disposed in the small diameter portion of said rotor, for transmitting power to said axle shafts, and means for rotatably supporting said countershaft adjacent said spur pinion, said means projecting into the annular space between the large diameter portion of said rotor and the spur gear carried by said rotor.

2. In a drive axle, a housing having a pair of axle shafts and a countershaft mounted for rotation therein about parallel axes; a drive gear on said countershaft; a hollow rotor mounted for rotation about the axis of said axle shafts; a spur pinion and spur gear for transmitting power from said countershaft to said rotor; planetary mechanism in said rotor for transmitting power from the latter to said axle shafts, the end of said countershaft remote from said bevel gear being carried in a bearing having a support projecting toward said axle shafts, said spur gear being disposed between said bearing support and said drive gear in nested relationship therewith, said rotor being provided with an enlarged diameter section the other side of said bearing support and containing an orbit gear of said planetary mechanism.

3. In a drive axle, a housing having a pair of axle shafts journalled therein and a drive shaft disposed substantially normal to said axle shafts; a countershaft mounted for rotation between said drive and axle shafts and disposed parallel to the latter; a pair of countershaft bearings carried in supports located substantially symmetrically either side of said drive shaft; a bevel gear on said countershaft adjacent one of said bearings and meshing with a pinion on said drive shaft; a rotor mounted for coaxial rotation about the axes of said axle shafts, and having a pair of spaced large diameter portions joined by a small diameter portion; the support for the other of said countershaft bearings being located between said large diameter portions; means adjacent one of said large diameter portions for transmitting power from said countershaft to said rotor; and planetary mechanism in said rotor for transmitting power to said axle shafts.

4. The drive axle defined in claim 3, wherein said planetary mechanism comprises sun, planet and orbit gears disposed in one of said large diameter portions, and a differential mechanism disposed in said small diameter portion.

5. The drive axle defined in claim 3, wherein one of said large diameter portions of said rotor comprises a spur gear.

6. The drive axle defined in claim 3, wherein the support for the other of said countershaft bearings projects into the space between said large diameter rotor portions, but is sufficiently narrow to permit a predetermined degree of endwise movement of said rotor with respect thereto.

LAWRENCE R. BUCKENDALE.